United States Patent
Sugihara

(10) Patent No.: US 8,873,869 B2
(45) Date of Patent: Oct. 28, 2014

(54) IMAGE PROCESSING APPARATUS AND CONTROL METHOD FOR THE SAME

(75) Inventor: Kenji Sugihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 285 days.

(21) Appl. No.: 12/902,541

(22) Filed: Oct. 12, 2010

(65) Prior Publication Data

US 2011/0091107 A1 Apr. 21, 2011

(30) Foreign Application Priority Data

Oct. 20, 2009 (JP) ................................. 2009-241883

(51) Int. Cl.
| | | |
|---|---|---|
| *G06K 9/00* | (2006.01) | |
| *G06K 9/34* | (2006.01) | |
| *G06K 9/36* | (2006.01) | |
| *G06K 9/46* | (2006.01) | |
| *H04N 19/126* | (2014.01) | |
| *H04N 19/60* | (2014.01) | |
| *H04N 19/17* | (2014.01) | |
| *H04N 19/149* | (2014.01) | |

(52) U.S. Cl.
CPC ..... *H04N 19/0026* (2013.01); *H04N 19/00096* (2013.01); *H04N 19/00775* (2013.01); *H04N 19/00181* (2013.01)
USPC ........... 382/232; 382/165; 382/166; 382/244; 382/251

(58) Field of Classification Search
USPC ........................... 382/232, 165–166, 244, 251
See application file for complete search history.

(56) References Cited

U.S. PATENT DOCUMENTS

| | | | |
|---|---|---|---|
| 6,665,446 B1 | 12/2003 | Kato | 382/251 |
| 7,574,016 B2 * | 8/2009 | Steinberg et al. | 382/103 |
| 8,363,720 B2 | 1/2013 | Fujii et al. | 375/240.03 |
| 2001/0050954 A1 | 12/2001 | Gautier et al. | 375/240.03 |
| 2004/0120399 A1 | 6/2004 | Kato | 375/240.11 |
| 2006/0062479 A1 | 3/2006 | Nakamura | 382/232 |

(Continued)

FOREIGN PATENT DOCUMENTS

| | | |
|---|---|---|
| CN | 1365576 | 8/2002 |
| CN | 1747553 | 3/2006 |

(Continued)

OTHER PUBLICATIONS

M. Yang, et al., "Detecting Faces in Images: A Survey", IEEE Transactions on Pattern Analysis and Machine Intelligence, vol. 24, No. 1, Jan. 2002, pp. 34-38.

(Continued)

*Primary Examiner* — Matthew Bella
*Assistant Examiner* — Weiwen Yang
(74) *Attorney, Agent, or Firm* — Fitzpatrick, Cella, Harper & Scinto

(57) ABSTRACT

In an image processing apparatus, an object region is extracted from image data that has been input, and an important region where degradation in image quality is to be reduced is selected with use of a feature quantity of image data of the object region or a peripheral region in a periphery of the object region. Among portions of the input image data, an image data portion outside of the important region is compressed and encoded with use of a first quantization step value, and an image data portion of the important region is compressed and encoded with use of a second quantization step value that is smaller than the first quantization step value.

4 Claims, 7 Drawing Sheets

(56) References Cited

U.S. PATENT DOCUMENTS

| | | | |
|---|---|---|---|
| 2009/0231627 A1* | 9/2009 | Matsuhira | 358/1.18 |
| 2009/0244093 A1* | 10/2009 | Chen et al. | 345/620 |
| 2010/0020341 A1* | 1/2010 | Enjuji | 358/1.9 |

FOREIGN PATENT DOCUMENTS

| | | | |
|---|---|---|---|
| JP | 2000-197050 A | 7/2000 | |
| JP | 2010-193441 A | 9/2010 | |
| JP | 2011-087090 A | 4/2011 | |

OTHER PUBLICATIONS

H.A. Rowley, et al., "Neural Network-Based Face Detection", IEEE Transactions on Pattern and Analysis and Machine Intelligence, vol. 20, No. 1, Jan. 1998, pp. 1-28.

Chinese Office Action dated Aug. 16, 2012 in counterpart Chinese Patent Application No. 201010523472.7, and English language translation thereof.

* cited by examiner

| NUMBER OF IMPORTANT REGIONS | REGION NAME | REGION POSITION INFORMATION | REGION DEGREE OF IMPORTANCE |
|---|---|---|---|
| 2 | IMPORTANT REGION: A | (X1,Y1)···(X4,Y4) | 1 |
|   | IMPORTANT REGION: B | (x1,y1)···(x4,y4) | 2 |

F I G. 9
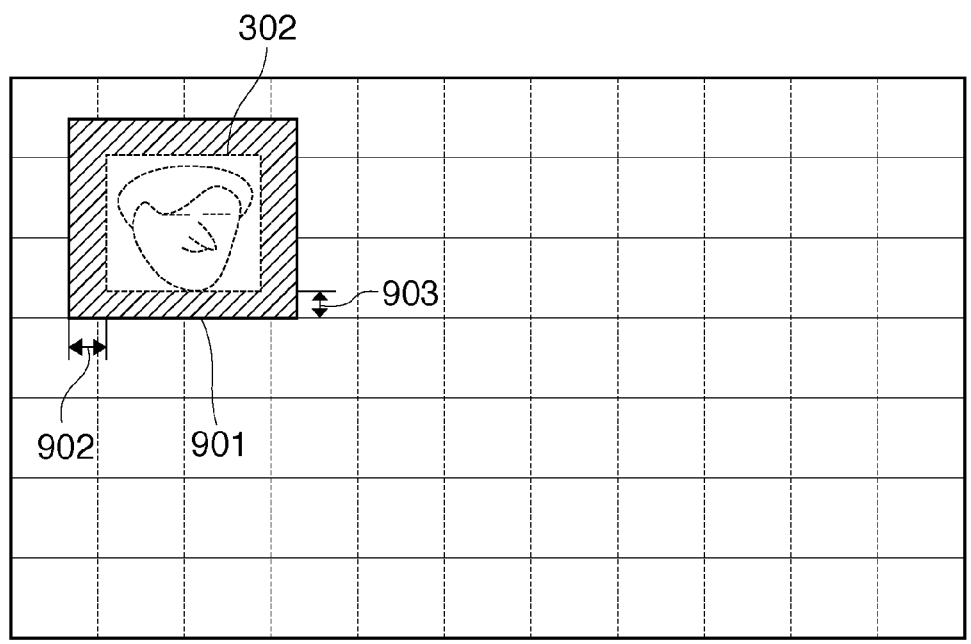
F I G. 10
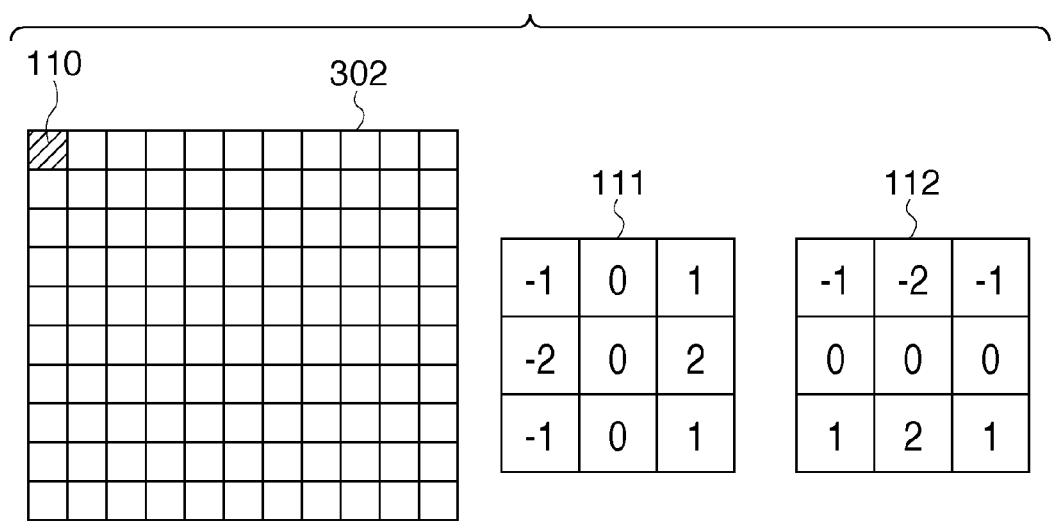

| CONDITION REGION | REGION SIZE | LUMINANCE | COLOR | EDGE | TOTAL NUMBER | DEGREE OF IMPORTANCE |
|---|---|---|---|---|---|---|
| REGION: A | IMPORTANT REGION | IMPORTANT REGION | NORMAL REGION | IMPORTANT REGION | 10 | 1.25 |
| REGION: B | IMPORTANT REGION | NORMAL REGION | NORMAL REGION | IMPORTANT REGION | 12 | 1.5 |
| REGION: C | NORMAL REGION | NORMAL REGION | IMPORTANT REGION | NORMAL REGION | 14 | 1.75 |

122

| | REGION SIZE | LUMINANCE | COLOR | EDGE |
|---|---|---|---|---|
| FEATURE QUANTITY-SPECIFIC POINTS | 3 | 2 | 2 | 1 |

IMAGE PROCESSING APPARATUS AND CONTROL METHOD FOR THE SAME

BACKGROUND OF THE INVENTION

1. Field of the Invention

The present invention relates to an image processing apparatus that automatically detects an object in an image and adaptively assigns an encoding amount in accordance with the relative degree of importance of the detected region.

2. Description of the Related Art

Conventionally, image encoding has been used to compress the data size of images, and the JPEG system standardized by the ISO (Internal Organization for Standardization) is widely used as an encoding system for still images. Also, the MPEG system, the H.264 system and the like, which have also been standardized by the ISO, are widely used as encoding systems for video.

It has been a fact that when lossy compression is used in such encoding systems, image quality degrades due to the amount of information being increasingly reduced the higher the frequency component of a region is. Japanese Patent Laid-Open No. 2000-197050 discloses technology for reducing such image degradation as much as possible in an important region (e.g., a person's face or body) in a captured image. In other words, a proposal has been made for the use of an image processing method called "recognition processing" for automatically detecting a specified object pattern in an image. One example of such technology for detecting a face in an image is the detection system by pattern matching with use of templates disclosed by Yang, et al. in "Detecting Faces in Images: A Survey" (see IEEE Transactions on Pattern Analysis and Machine Intelligence, Vol. 24, No. 1, January 2002).

However, the system disclosed in Japanese Patent Laid-Open No. 2000-197050 simply detects faces in an image and assigns a high encoding amount to the detected regions. The encoded data size therefore increases significantly. In view of usage such as monitoring with use of a network camera, which has been on a rising trend in recent years, there has been an increasing need to take communication load into consideration. In other words, there is demand for the ability to suppress the encoded data size of image data as much as possible in a lossy compression process for image data.

SUMMARY OF THE INVENTION

Embodiments of the present invention provide an image processing apparatus that enables suppressing the encoded data size of image data by selecting an object in the image data as a region where an encoding amount is to be assigned.

One aspect of the present invention is an image processing apparatus including: a region extraction unit that extracts an object region from image data that has been input; an important region selection unit that selects an important region where degradation in image quality is to be reduced, with use of a feature quantity of image data of the object region or a peripheral region in a periphery of the object region; and an encoding unit that compresses and encodes, among portions of the input image data, an image data portion outside of the important region with use of a first quantization step value, and compresses and encodes an image data portion of the important region with use of a second quantization step value that is smaller than the first quantization step value.

Further features of the present invention will become apparent from the following description of exemplary embodiments with reference to the attached drawings.

BRIEF DESCRIPTION OF THE DRAWINGS

FIG. 9 is a diagram showing an analysis region for extracting luminance information in a face region.

FIG. 10 is a diagram showing a Sobel edge detection method.

FIG. 11 is a diagram showing an example in which degrees of importance have been determined based on a plurality of region determination conditions.

DESCRIPTION OF THE EMBODIMENTS

Embodiment 1

Figure 1:
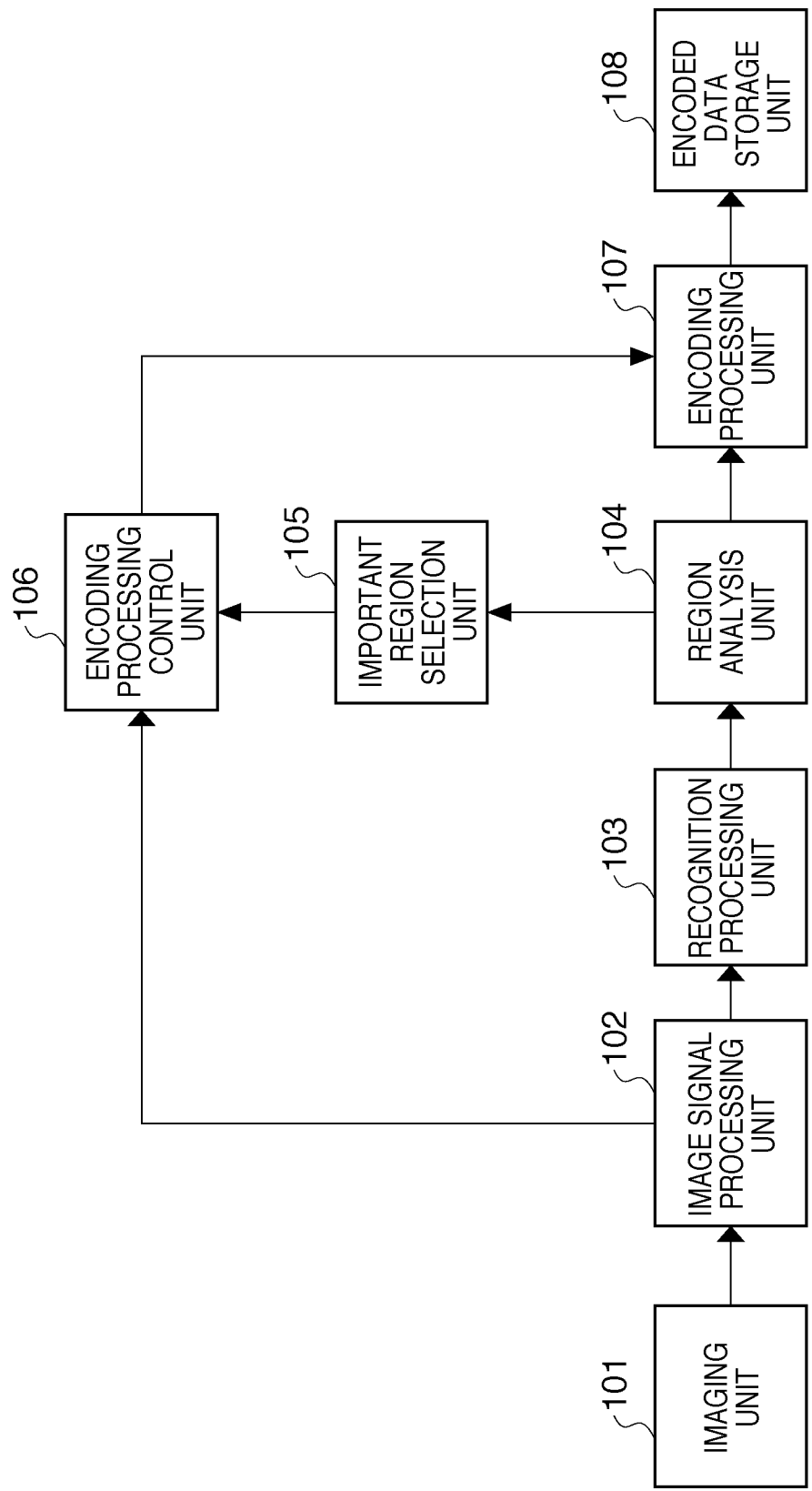
FIG. 1 is a block diagram showing a configuration of an image processing apparatus.

FIG. 1 is a block diagram showing a configuration of an image processing apparatus according to Embodiment 1. In FIG. 1, an imaging unit 101 includes a lens and an image sensor, and captures an image. An image signal processing unit 102 executes a series of image signal processing including gamma conversion, color space conversion, raster/block conversion, and the like. A recognition processing unit 103 performs processing for recognizing an object in an input image on which a series of image processing has been performed. Furthermore, a region analysis unit 104 analyzes feature quantities of a detected face region and an analysis region in the periphery of the face region.

An important region selection unit 105 analyzes a feature quantity and selects an important region in an image based on the feature quantity. An encoding processing control unit 106 sets various types of parameter values that are referenced when an encoding processing unit 107 performs encoding processing based on the feature quantity of the important region selected by the important region selection unit 105. The encoding processing unit 107 executes compression encoding processing in accordance with the parameter values set by the encoding processing control unit 106. An encoded data storage unit 108 records compression-encoded data (hereinafter, referred to as "encoded data") to a recording medium such as a magnetic tape or a memory card.

The recognition processing unit 103 of the present embodiment performs region extraction for extracting a face region for a person, which is determined to be generally highly important as an imaging target, and performs face recognition processing. The region analysis unit 104 then analyzes the region size of the face region extracted by the recognition processing unit 103. The important region selection unit 105 selects, based on the region size, a relatively small face region for reducing degradation of image quality, and assigns an encoding amount to the selected face region. The encoding processing control unit 106 and the encoding processing unit 107 will be described below taking the example of performing compression processing with use of the JPEG compression system.

First is a description of the method by which the recognition processing unit 103 performs face recognition processing. Processing for detecting a face region can be executed with use of, for example, the system proposed by Rowley, et al. in "Neural network-based face detection" (see IEEE Transactions on Pattern Analysis and Machine Intelligence, Vol. 20, No. 1, January 1998), that is to say, detecting a face pattern in an image using a neural network. The following briefly describes this face detection method.

Firstly, image data targeted for face detection is read to a memory. A predetermined region to be compared with a face is then cut out of the read image. A distribution of pixels values in the cutout region is used as input, and a neural network-based calculation is performed, thus obtaining one output result. Here, neural network weights and thresholds have been learned in advance with use of an extensive number of face image patterns and non-face image patterns. For example, by setting the threshold to 0, output of the neural network is determined to be a face if it is greater than or equal to 0, and to not be a face if otherwise.

Figure 5:
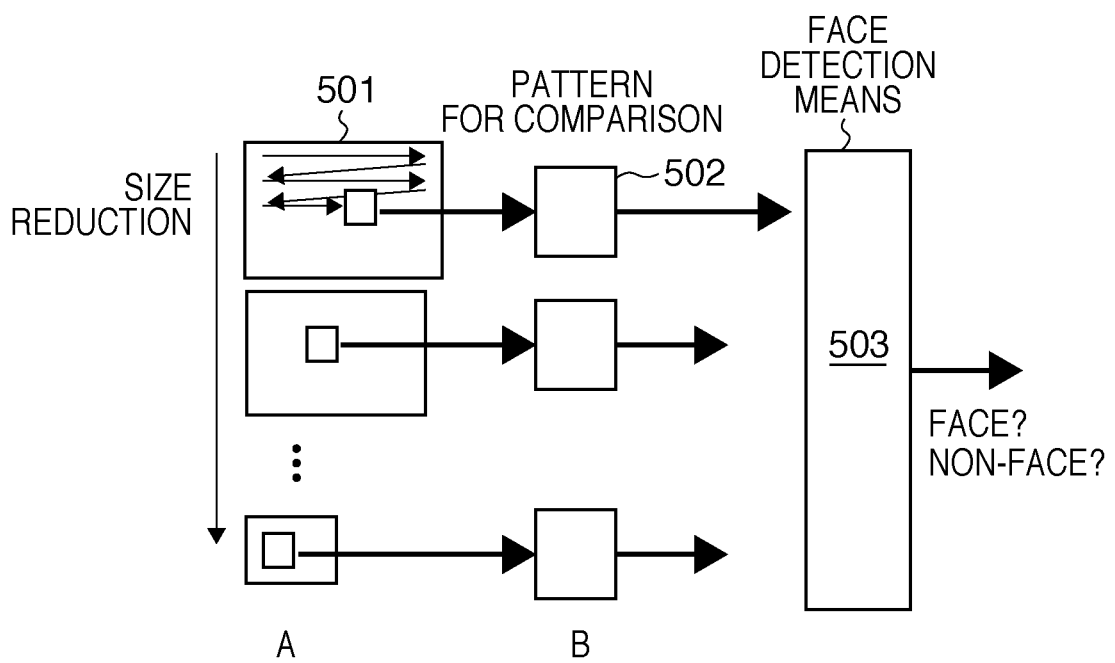
FIG. 5 is a diagram showing a method of searching for a face pattern in an image and extracting the region size of a found face region.

Also, the cutout position of an image pattern 502 for comparison with a face, which is used as input to the neural network, is sequentially scanned vertically and horizontally within a total image area 501 as shown in FIG. 5, for example. This scanning enables detecting faces in an image. During the scanning, a face determination means 503 determines whether a face exists in the scanning area. Furthermore, in order to accommodate the detection of various sizes of faces, as shown in FIG. 5, the read image is sequentially reduced in size by a predetermined percentage, and the above-described scanning for face detection is performed on each of the sequentially size-reduced images. This enables executing face detection processing for detecting various sizes of faces.

Next is a description of a flow of processing in the image processing apparatus having the configuration shown in FIG. 1, in the case where an image has been captured, recognition processing is performed on the captured image data, and the image data is thereafter recorded as encoded data, with reference to FIGS. 1 to 4.

Figure 2:
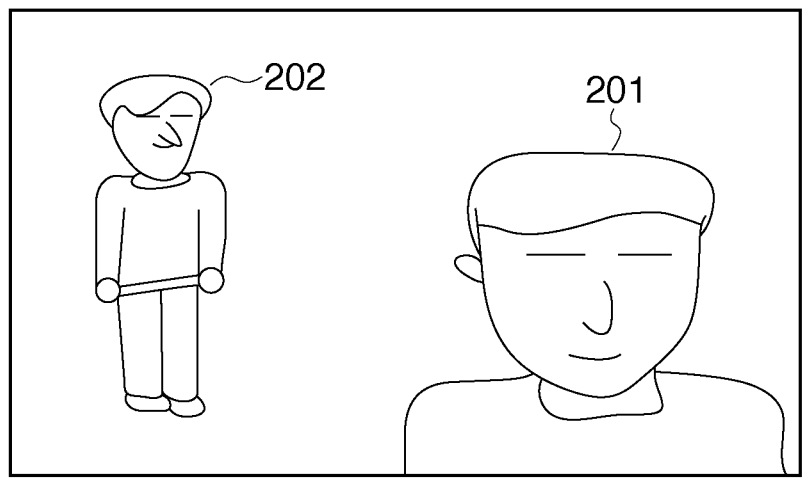
FIG. 2 is a diagram showing an example of face detection processing in a normal imaging environment.
Figure 3:
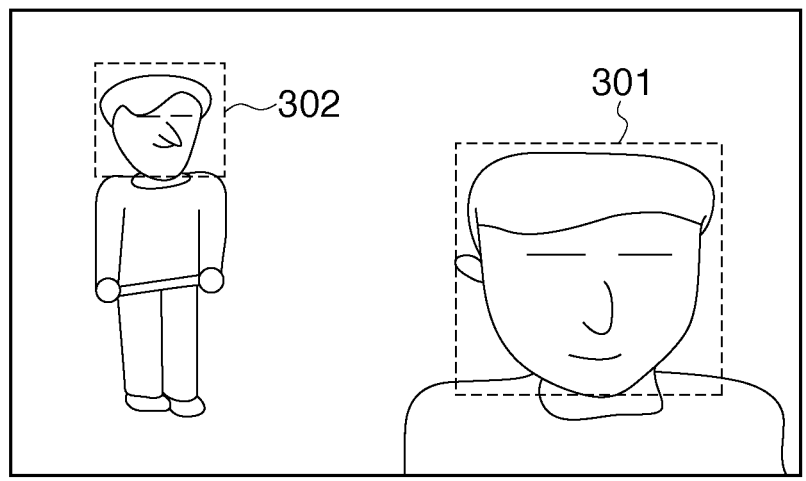
FIG. 3 is a diagram showing an example in which face regions have been detected in a captured image.

FIG. 2 shows a person 201 and a person 202 that have been imaged in a normal environment. The person 202 is positioned farther away, and the person 201 is positioned close. The size of the face region of the person 202 is therefore smaller than the size of the face region of the person 201. FIG. 3 shows a processing result obtained by the recognition processing unit 103 performing recognition processing on the input image data shown in FIG. 2 with use of the face detection method shown in FIG. 5. Here, the detected face regions, that is to say, object regions 301 and 302 are enclosed in broken-line rectangle frames.

Figure 4:
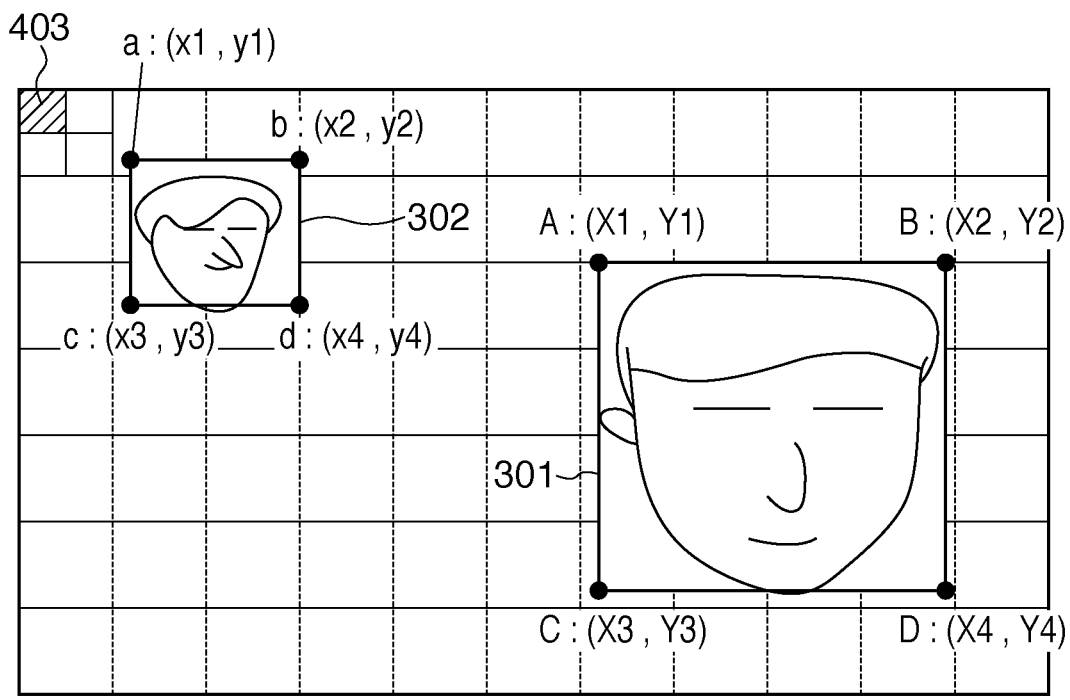
FIG. 4 is a diagram showing position coordinates of four vertexes of rectangles representing the detected face regions.

The face region 301, which is an object region, shows an example of the case where a face region in an image is relatively large, and the face region 302 shows an example of the case where a face region in an image is relatively small. FIG. 4 shows a result obtained by the recognition processing unit 103 extracting position information regarding the face regions in the image data shown in FIG. 3.

In the present embodiment, the image signal processing unit 102 performs a series of image signal processing including gamma conversion, color space conversion, raster/block conversion, and the like on the image data input from the imaging unit 101. The recognition processing unit 103 then detects face regions in the image on which the series of image processing has been performed, with use of the recognition processing method shown in FIG. 5. As one example of output results of the face detection processing, position coordinates indicating positions of four vertexes of rectangles including face regions that are object regions shown in FIG. 4 are output.

The following gives definitions of various regions used in the present embodiment. Regions in the present embodiment include face detection regions (object regions), analysis regions, and regions where an encoding amount is to be assigned. A face detection region is a rectangle region where the recognition processing unit 103 has detected a person's face. An analysis region is a region that is in the periphery of the object region, and where a feature quantity is extracted, and the analysis region can be determined according to a face detection region. Note that depending on the feature quantity, there are cases where a face detection region and an analysis region are the same region. A region where an encoding amount is to be assigned is a region where the encoding processing unit 107 actually assigns an encoding amount. For example, when performing encoding processing on a face detection region, the region where an encoding amount is to be assigned is a region that includes a face region and whose size is the number of blocks according to which encoding processing is performed. Hereinafter, the present embodiment is described based on the above definitions of these three regions.

The region analysis unit 104 analyzes the sizes of the face regions extracted by the recognition processing unit 103. The following describes a method used to analyze the size of a face region with reference to FIG. 4. As shown in FIG. 4, the recognition processing unit 103 detects face regions and outputs position coordinates of four vertexes of each rectangle including a face region. The region analysis unit 104 calculates the region size of each region based on the position information output by the recognition processing unit 103. As one example, Equation (1) below is used to obtain the region size of the region 301 shown in FIG. 4.

$$S_1 = |X1-X2| \times |Y1-Y3| \qquad (1)$$

Here, $S_1$ is a variable indicating the region size of the region 301. In Equation (1), a distance in the horizontal direction and a distance in the vertical direction are calculated based on the position coordinates, and the region size is calculated with use of the obtained distance values. Note that here, an area is calculated by obtaining the horizontal distance and the vertical distance in the case of a rectangle whose sides are vertical and horizontal. However, in the case where the targeted region is not a rectangle, the area may be obtained using numbers of pixels in the region based on information indicating the region size.

Next, the important region selection unit 105 selects an important region in the image with use of the region sizes of the face regions analyzed by the region analysis unit 104. In the present embodiment, a comparison with a region size threshold is performed in order to select a face region whose region size (area) is less than or equal to a threshold as an important region. This threshold can be determined in advance as an arbitrary value. The analyzed regions sizes are then compared with the region size threshold, and if a region size is less than or equal to a predetermined region size, the corresponding region is selected as an important region, and otherwise the corresponding region is selected as a normal region. Accordingly, the important region selection unit 105 shown in FIG. 1 compares the region sizes of the face regions 301 and 302 that were analyzed by the region analysis unit 104 with a region size threshold ($TH_1$) that has been set in advance. In the present embodiment, it is assumed that the region 302 has been selected as an important region since the region size of the region 302 is smaller than the threshold (TH₁). As a result of this processing, the important region selection unit 105 outputs the position coordinates of the face region selected as an important region.

Next, the encoding processing control unit 106 performs encoding amount control for controlling the encoding processing unit 107 based on the result of the important region selection performed by the important region selection unit 105. The following is a description of encoding processing and an encoding amount control method implemented by the encoding processing control unit 106 and the encoding processing unit 107 in this case, with reference to the flowchart shown in FIG. 6.

Firstly, in step S101 the encoding processing unit 107 performs YUV conversion processing on the input image data that is configured by RGB data. Below are conversion equations for YUV conversion.

$$Y=0.2990R+0.5870G+0.1140B$$

$$U=-0.1684R-0.3316G+0.5000B$$

$$V=0.5000R-0.4187G-0.0813B$$

Next, in step S102 the encoding processing unit 107 performs sampling processing with use of a sampling method set by the encoding processing control unit 106, on the UV color components of the YUV data obtained by conversion. In Embodiment 1, sampling processing is assumed to be implemented with use of a method of thinning out the UV data by ½ in the horizontal direction.

In step S103, the encoding processing unit 107 performs orthogonal transform processing by discrete cosine transform. For example, with the JPEG system, the orthogonal transform processing is normally performed in units of 8-pixel×8-pixel blocks called MCUs (minimum coded units), one of which is indicated by a region 403 in FIG. 4.

Next, in step S104 the encoding processing control unit 106 first determines, based on the output result of the important region selection unit 105, an encoding target block that includes the important region and is where a high encoding amount is to be assigned. In the present embodiment, since the encoding processing is performed in units of MCUs, an encoding target block 801 shown in FIG. 8 that includes the face region 302, which is the important region, is assumed to be the encoding target block where a high encoding amount is to be assigned. The encoding processing control unit 106 determines, for each processing target block (MCU) that is targeted for encoding processing, whether the block is a block included in the encoding target block where an encoding amount is to be assigned.

If the block has been determined to be the encoding target block 801 included in the encoding target block where a high encoding amount is to be assigned, in step S105 the encoding processing control unit 106 uses, with respect to the encoding target block, a second quantization step in which the encoding amount is relatively high, that is to say, in which the quantization step value is relatively low. In order to cause the encoding amount to be relatively high, the encoding processing control unit 106 selects an important region quantization table that has been set in advance and is for setting a small quantization step value.

If the block has been determined in S104 to not be a block included in the encoding target block where a high encoding amount is to be assigned, that is to say, in the case of a region other than an object region including a face, in step S106 the encoding processing control unit 106 selects a quantization table that has been set in advance and is for using a first quantization step for normal regions.

Next, in step S107 division is performed with use of a quantization matrix that makes use of the quantization table set in step S105 or step S106, and quantization processing for reducing the information amount is performed. In the present embodiment, the encoding processing control unit 106 sets, in the encoding processing unit 107, information indicating whether the current encoding target block is an encoding target block corresponding to the analyzed important region, and quantization table information to be used when quantizing the current encoding target block. The encoding processing unit 107 performs quantization processing on the encoding target block in accordance with the information set by the encoding processing control unit 106.

Next, in step S108, variable-length encoding processing with use of Huffman code is performed on the image data that was subjected to quantization processing and output in step S107, and entropy encoding processing is performed to further reduce the information amount.

Lastly, in step S109 a determination is made as to whether encoding processing has been implemented on all of the encoding target blocks. If encoding processing has ended for all of the encoding target blocks, the procedure ends without other processing, and otherwise the procedure returns to step S104, and processing is performed again.

Figure 6:
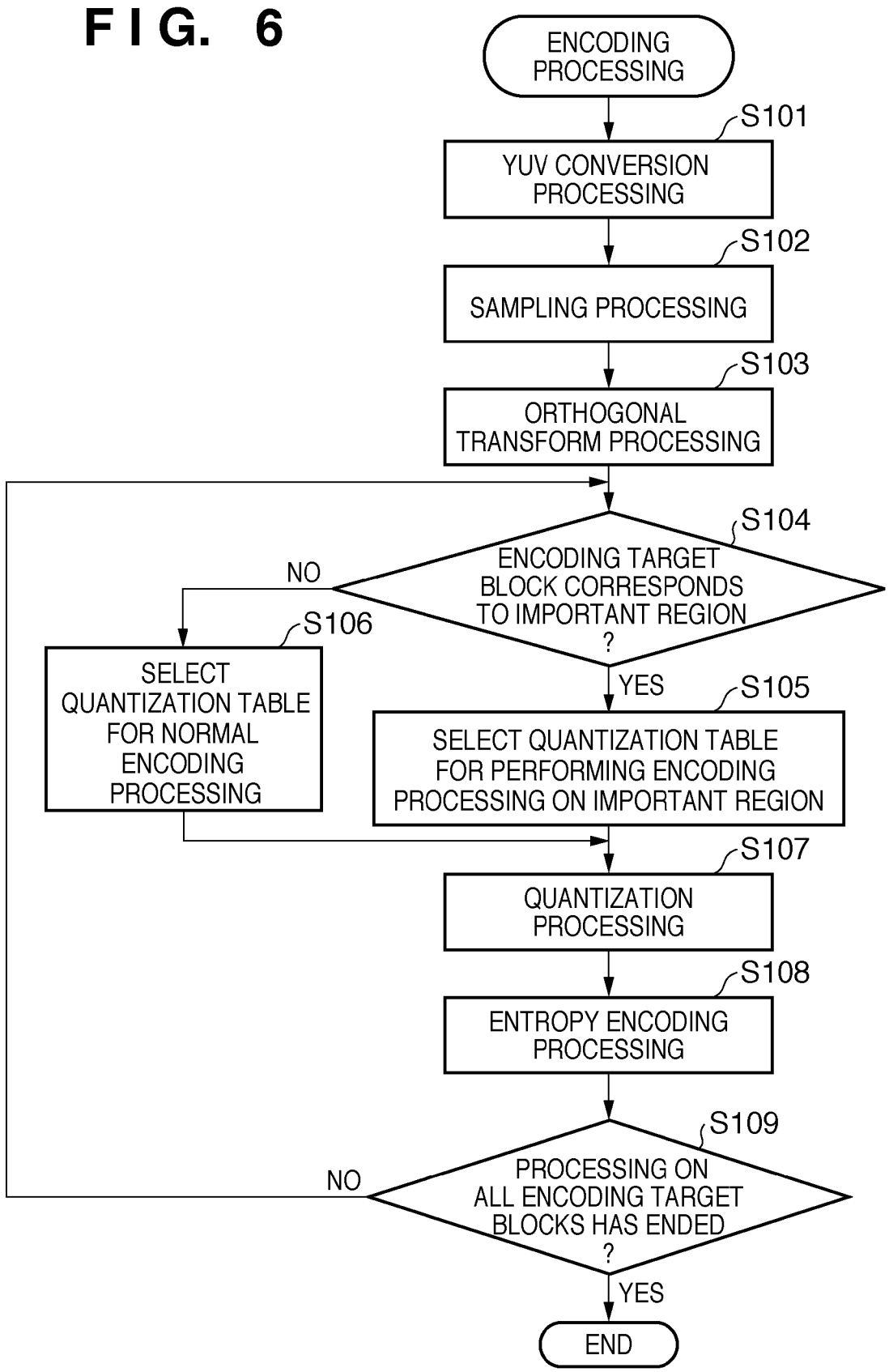
FIG. 6 is a flowchart showing encoding amount control processing and encoding processing.

Next, after the series of encoding processing has been performed by the encoding processing unit 107 in accordance with the flowchart shown in FIG. 6, the encoded data is temporarily buffered by the encoded data storage unit 108, and thereafter recorded to a recording medium such as a magnetic tape or a memory card.

Note that regarding the data encoded by the encoding processing control unit 106 and the encoding processing unit 107, the rate of the encoded data output from the encoding processing unit 107 is not constant when being temporarily accumulated in the encoded data storage unit 108. Accordingly, the encoding processing control unit 106 prevents the encoded data storage unit 108 from overflowing or instead becoming empty by controlling the quantization processing in step S105.

Figures 7, 8:
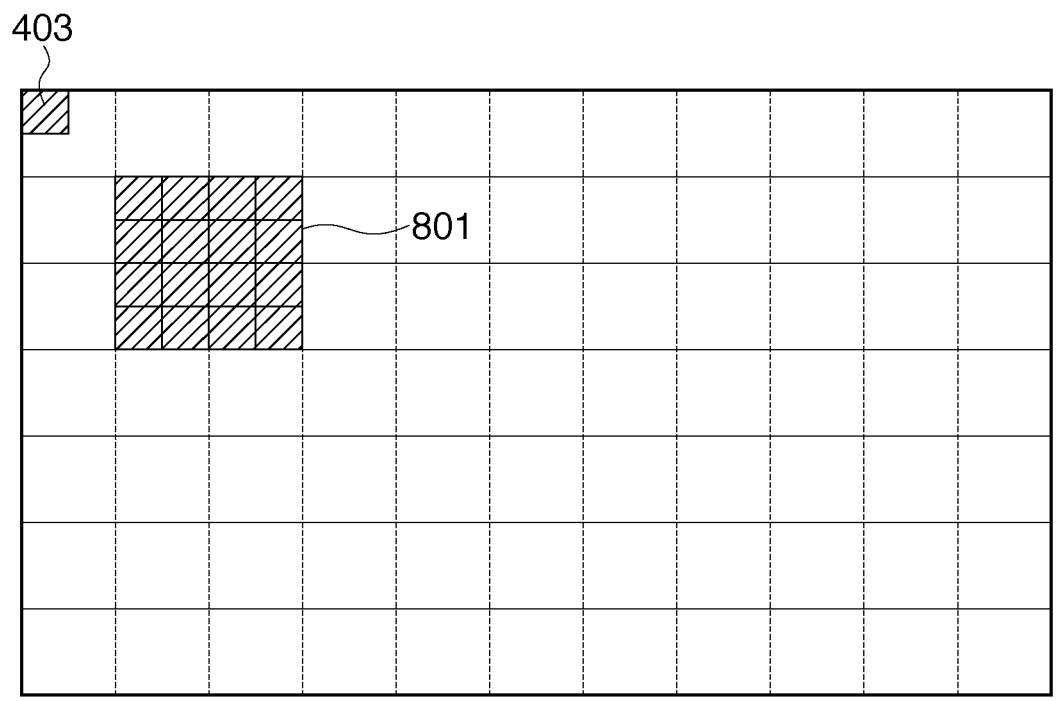
FIG. 7 is a diagram showing an example of an output result of an important region determination unit.
FIG. 8 is a diagram showing the position of an encoding target block corresponding to a detected important region.

Note that the important region selection unit 105 described in the present embodiment determines whether a region is an important region by setting one region size threshold. However, if a plurality of region size thresholds are set in advance in order to more finely select important regions, determining a range of region size thresholds in which a region size to be targeted falls enables selecting more finely classified important regions among important regions. In such a case where a plurality of important regions exist, and a finely classified important region is to be further selected in a selection method, the important region selection unit 105 outputs information indicating the position coordinates and the degrees of importance of important regions. FIG. 7 shows an example of an output result in this case. The lower the "region degree of importance" shown in FIG. 7 is, the higher the degree of importance. Also, it can be seen in the example shown in FIG. 7 that the important region A has a higher degree of importance than the important region B. In such a case where important regions have various degrees of importance, processing similar to that described above can be performed in step S105 by providing a plurality of quantization tables in accordance with the degrees of importance in advance.

Furthermore, instead of comparing the degree of importance of an important region with a threshold, a configuration is possible in which the important regions are sequenced, and an encoding amount is assigned to several important regions that are highest in the sequence.

Also, although only the encoding amounts of important regions are controlled in the present embodiment, a configuration is possible in which an encoding amount is assigned to important regions, and a lowered encoding amount is assigned to other regions. A case is also possible in which data having various resolutions is input. In this case, a configuration is employed in which a coefficient is provided, the number of pixels indicating the input resolution is multiplied by the coefficient to obtain a threshold, and the obtained threshold is used in processing.

In this way, according to the present embodiment, not only is a person, particularly a face region, having a relatively high degree of importance as an imaging target detected, but also the region size of the face region is detected. Accordingly, the encoding processing control unit 106 adaptively lowers the quantization step value for image blocks in a face region that is relatively highly important among all of the face regions, thus enabling increase the information amount for that face region. Consequently, in the image processing of the present embodiment, it is possible to perform encoding processing that obtains a favorable result in a psycho-visual model, and furthermore it is possible to minimize an increase in the encoding amount of the data to be recorded. This enables saving space on a recording medium as well as reducing the communication load in the case of transfer over a network.

Note that a description has been given in the present embodiment of an example of changing the quantization step value used by the encoding processing unit 107 in order to control the encoding amount. However, the present embodiment is not limited to changing the quantization step value, and control may be performed with use of any encoding condition as long as it enables changing the encoding amount for partial regions.

Also, although the example of the JPEG compression system has been used in the description of the present embodiment, needless to say there is no limitation to the JPEG system. For example, the JPEG-XR compression system can be used if a tile unit is determined in conformity with a face region extracted by recognition processing, and an encoding amount is assigned to a tile region corresponding to an encoding target block where an encoding amount is to be assigned. Alternatively, it is possible to use an ROI (region of interest) defined by the JPEG2000 compression system as an encoding target block where an encoding amount is to be assigned.

Embodiment 2

The following description of the present embodiment focuses on differences from Embodiment 1.

In Embodiment 1, an important region is selected based on the region size of a face region, and an encoding amount is assigned to the selected region. In Embodiment 2, an important region is selected with use of luminance information in a region in the periphery of a face region.

The following describes an example of assigning an encoding amount to an important region selected with use of this luminance information, with reference to FIG. 1. Here, if the luminance of a region in the periphery of a face region is dark, that face region that is selected as an important region. Note that a description of portions in FIG. 1 that are the same as in Embodiment 1 has been omitted.

The region analysis unit 104 determines an analysis region for analyzing luminance information based on the position coordinates of the face region 302 output by the recognition processing unit 103, and analyzes the luminance information (Y component) in the analysis region. In the present embodiment, as shown in FIG. 9, an analysis region 901 (hatched portion) is assumed to be a region that is in a predetermined peripheral region and is a region of eight pixels in both the horizontal direction and the vertical direction from the face region 302. A region 902 indicates a region of eight pixels in the horizontal direction from the face region 302, and a region 903 indicates a region of eight pixels in the vertical direction from the face region 302. Note that although analysis is performed using an analysis region that is a region with a range of eight pixels in the horizontal direction and the vertical direction in the present embodiment, needless to say the analysis region is not limited to being a region of eight pixels in the horizontal direction and the vertical direction.

Next, the region analysis unit 104 extracts luminance information from the pixels in the analysis region 901. Average luminance information is obtained with use of the luminance information extracted from the analysis region 901, using the calculation equation below.

$$S=(y_1+y_2+\ldots+y_n)/N$$

S: average luminance information
N: number of pixels

In the present embodiment, the obtained average luminance information of the analysis region 901 is represented by $S_a$, and this average luminance information is output from the region analysis unit 104.

Next, the important region selection unit 105 compares $S_a$ output from the region analysis unit 104 and an average luminance threshold $S_{TH}$ that has been set in advance, and selects the face region as an important region if $S_a$ is less than or equal to $S_{TH}$, that is to say, the predetermined average luminance information threshold. In the present embodiment, it is assumed that $S_a$ is less than $S_{TH}$, and therefore the face region 302 is selected as an important region.

Next, the encoding processing control unit 106 selects a quantization table in the present embodiment in step S105 or step S106 shown in FIG. 6. In Embodiment 2, in addition to a quantization table that has been prepared in advance for normal regions and is used for luminance information (DC coefficients), a quantization table used for DC coefficients in encoding processing for important regions is provided. Using this quantization table enables reducing the quantization step value.

Note that the important region selection unit 105 selects important regions and normal regions with use of one threshold pattern that has been set in advance. However, in order to more finely select important regions, a plurality of threshold patterns can be provided, thus enabling setting degrees of importance in accordance with the thresholds. In the case where important regions have various degrees of importance, processing similar to that described above can be performed by providing a plurality of patterns of quantization tables for DC coefficients in accordance with the degrees of importance in advance. Note that regarding color component information (AC coefficients), the same quantization table can be used for normal regions and important regions.

Also, in Embodiment 2, a face region is determined to be an important region if the luminance of a peripheral region is darker than a preset threshold. However, a face region can be similarly processed as an important region if the luminance of a peripheral region is brighter than a preset threshold. Also, a configuration is possible in which thresholds for determining both darker and lighter regions are provided, and face regions having both of such peripheral regions are processed as important regions.

In this way, in Embodiment 2, not only is a person, particularly a face region, having a relatively high degree of importance as an imaging target detected, but also luminance information in a region in the periphery of the face region is detected, thus enabling achieving effects similar to those of Embodiment 1.

Embodiment 3

The following description of the present embodiment focuses on differences from Embodiments 1 and 2.

In Embodiment 1, an important region is determined based on the region size of a face region, and in Embodiment 2, an important region is determined based on luminance information in the periphery of a face region. In the present embodiment, an important region is selected with use of color information in a region in the periphery of a face region, and an encoding amount is assigned to the selected important region.

Below is a description of Embodiment 3 with reference to FIG. 1. Here, a face region is selected as an important region if the color component of a region in the periphery of the face region is close to the color information of the face region. Note that a description has been omitted for portions that are the same as those in FIG. 1, which have already been described in Embodiments 1 and 2.

The region analysis unit 104 determines an analysis region for analyzing color information based on the position coordinates of the face region 302 output by the recognition processing unit 103, and analyzes the color information (UV component) in the analysis region. In Embodiment 3, the analysis region 901 shown in FIG. 9 is analyzed similarly to Embodiment 2. Note that although the color space is expressed using YUV in Embodiment 2, needless to say analysis may be performed using a different color space.

Next, the region analysis unit 104 extracts color information from the pixels in the analysis region 901 and the face region 302. Average color information is obtained for each of the UV components using the color information extracted from the analysis region 901 and the face region 302, with use of the calculation equation below.

$S_u = (u_1 + u_2 + \ldots + u_n)/N$ $S_v = (v_1 + v_2 + \ldots + v_n)/N$ $S_u$: average color information (U)
$S_v$: average color information (V)
N: number of pixels In the present embodiment, the obtained average color information of the analysis region 901 is represented by $S_{ua}$ and $S_{va}$, the average color information of the face region 302 is represented by $S_{uf}$ and $S_{vf}$, and this average color information is output from the region analysis unit 104.

Next, the important region selection unit 105 obtains a difference between the average color information of the analysis region 901 and the face region 302, which was output from the region analysis unit 104. The obtained difference result is assumed to be $SUV_{ua-uf}$ and $SUV_{va-vf}$, and these are compared to thresholds $SUV_{THu}$ and $SUV_{THv}$ that have been set in advance. Then, if both $SUV_{ua-uf}$ and $SUV_{va-vf}$ are less than or equal to the preset average color information thresholds, the important region selection unit 105 selects the face region as an important region. In the present embodiment, it is assumed that both $SUV_{ua-uf}$ and $SUV_{va-vf}$ are less than $SUV_{THu}$ and $SUV_{THv}$, and therefore the face region 302 has been selected as an important region.

Next, the encoding processing control unit 106 selects a quantization table in the present embodiment in step S105 or step S106 shown in FIG. 6. In the present embodiment, in addition to a quantization table that has been prepared in advance for normal regions and is used for color information (AC coefficients), a quantization table used for AC coefficients in encoding processing for important regions is provided. Using this quantization table for AC coefficients in the important region during important region quantization processing enables reducing the quantization step value.

Note that the important region selection unit 105 of the present embodiment selects important regions and normal regions with use of only one threshold pattern that has been set in advance. However, in order to more finely select important regions, a plurality of threshold patterns can be provided, thus enabling setting degrees of importance in accordance with the thresholds. In the case where important regions have various degrees of importance, processing similar to that described above can be performed by providing a plurality of patterns of quantization tables for AC coefficients in accordance with the degrees of importance in advance. Note that regarding luminance component information (DC coefficients), the same quantization table can be used for normal regions and important regions.

In this way, according to Embodiment 3, not only is a person, particularly a face region, having a relatively high degree of importance as an imaging target detected, but also color information in a region in the periphery of the face region is detected, thus enabling achieving effects similar to those of Embodiments 1 and 2.

Embodiment 4

The following description of the present embodiment focuses on differences from Embodiments 1 to 3.

In the present embodiment, a description is given of an example of selecting an important region with use of edge information in a face region, with reference to FIG. 1. Here, if a ratio of the number of edges in a face region is high, that face region is selected as an important region. Note that a description of portions in FIG. 1 that are the same as in Embodiments 1 and 2 has been omitted.

The region analysis unit 104 sets the face region 302 output by the recognition processing unit 103 as an analysis region similarly to Embodiment 1, and analyzes edge information in the analysis region. Note that generally a first derivation system or a second derivation system is used in the analysis of edge information. Typical examples of a first derivation system include Prewitt and Sobel. Also, a typical example of a second derivation system is Laplacian. In the present embodiment, edge analysis is performed using the Sobel method, and a brief description of the edge detection method is given below with reference to FIG. 10. Note that the following description assumes that binarization processing has already been performed before performing edge detection.

FIG. 10 shows the face region 302 in units of pixels. A region 110 indicates one pixel in the face region 302. A table 111 and a table 112 indicate Sobel operators for the Δx direction and the Δy direction for performing Sobel filter processing. Using these Sobel operators, filter processing is performed on all of the pixels in the face region 302, and a change amount is extracted for each pixel, thus extracting edge portions.

Next, after processing for binarizing the input face region 302 has been performed, the region analysis unit 104 extracts edge information from the pixels with use of the above-described Sobel method. A ratio of the number of edges in the region is obtained with use of the edge information extracted from the face region 302, using the calculation equation below.

$$Re_f = Num_e / N$$

$Re_f$: edge ratio
$Num_e$: total number of edges in face region
N: total number of pixels In the present embodiment, the obtained edge ratio of the face region 302 is represented by $Re_f$, and this edge ratio is output from the region analysis unit 104.

Next, the important region selection unit 105 compares $Re_f$ output from the region analysis unit 104 and a threshold $Re_{TH}$ that has been set in advance, and selects the face region as an important region if $Re_f$ is greater than $Re_{TH}$. In the present embodiment, it is assumed that if $Re_f$ is greater than $Re_{TH}$, that is to say, the predetermined edge ratio, the face region 302 is selected as an important region. Also, although the ratio of the number of edges in the face region 302 is obtained here, it is possible to use a method of determining important regions with use of simply the number of edges.

Note that in the present embodiment, the important region selection unit 105 selects important regions and normal regions with use of one edge ratio threshold that has been set in advance. However, in order to more finely select important regions, a plurality of edge ratio thresholds can be provided, thus enabling setting degrees of importance in accordance with the thresholds. In the case where important regions have various degrees of importance, processing similar to that described above can be performed by providing a plurality of edge ratio quantization tables in accordance with the degrees of importance in advance.

In this way, according to the present embodiment, not only is a person, particularly a face region, having a relatively high degree of importance as an imaging target detected, but also edge information in the face region is detected, thus enabling achieving effects similar to those of the other embodiments.

Embodiment 5

The following description of the present embodiment focuses on differences from the above-described embodiments.

In the present embodiment, a description is given of the example of the case of determining an important region based on a plurality of feature quantities, with reference to FIG. 1. Note that a description of portions in FIG. 1 that are the same as in the above-described embodiments has been omitted.

In the present embodiment, the region analysis unit 104 determines the analysis region 901 for analyzing luminance information and color information based on the position coordinates of the face region 302 output by the recognition processing unit 103. Then, similarly to the above-described Embodiments 1 to 4, the region analysis unit 104 obtains the region size and edge information of the face region 302, and obtains luminance information and color information from the analysis region 901. The region analysis unit 104 outputs the face region size, the average luminance information, the average color information, and the edge information obtained as results of the analysis.

Next, the important region selection unit 105 selects an important region with use of the analysis results output from the region analysis unit 104. In the present embodiment, a degree of importance is determined based on a plurality of conditions (feature quantities) as shown in FIG. 11. Note that the algorithm for determining a degree of importance can be set arbitrarily.

In the present embodiment, the degrees of importance shown in table 121 are determined based on the weights of the feature quantities shown in table 122 in FIG. 11. Here, feature quantity-specific degrees of importance are given as 1 (an important region) or 2 (not an important region) depending on whether a region is an important region with respect to a feature quantity, and "total number" shown in table 121 indicates a total obtained by multiplying these feature quantity-specific degrees of importance by weighted numerical values of the feature quantity-specific degrees of importance points in table 122. Also, "degree of importance" shown in table 121 is a value indicating a degree of importance obtained by dividing the total number by eight. Furthermore, the degree of importance is compared with a threshold that has been set in advance, and a region whose degree of importance is less than the threshold is selected as a target for assigning an encoding amount, that is to say, an important region. For example, in the case where the threshold is 1.5, and a region whose degree of importance is less than the threshold is selected as an important region, in table 121 the region A is selected as an important region. Also, in the case where the threshold is 1.6, and a region whose degree of importance is less than the threshold is selected as an important region, in table 121 the regions A and B are selected as important regions. Note that the algorithm for determining degrees of importance is not limited to this, and may be set arbitrarily.

Next, the encoding processing control unit 106 selects a quantization table in the present embodiment in step S105 or step S106 shown in FIG. 6. In this example, in addition to the quantization table for normal regions that has been prepared in advance, a plurality of patterns of quantization tables for important regions in accordance with the degrees of importance are provided. Here, the number of quantization tables that are provided is the same as the number of degrees of importance, and in the example shown in FIG. 11, fifteen patterns of quantization tables are provided. Accordingly, performing quantization using these quantization tables in accordance with the respective degrees of importance during important region quantization processing enables reducing the quantization step value.

In this way, according to the present embodiment, not only is a person, particularly a face region, having a relatively high degree of importance as an imaging target detected, but also a region size and edge information of the face region, and luminance information and color information of an analysis region are detected. Combining these feature quantities and using them in encoding amount control enables performing control more finely than with the encoding amount control described in Embodiments 1 to 4.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241883, filed Oct. 20, 2009, which is hereby incorporated by reference herein in its entirety.

What is claimed is:

1. An image processing apparatus comprising:
    a region extraction unit for extracting at least one object region from image data that has been input;
    an analyzing unit for analyzing average color information of pixels in each at least one object region extracted by said region extraction unit and analyzing average color information of pixels in a peripheral region being in the periphery of the object region;
    a calculation unit for calculating a difference between the average color information of pixels in an object region of interest and that of pixels in a peripheral region of the object region of interest;
    an important region selection unit for selecting the object region of interest as an important region where degradation in image quality is to be reduced, if the difference is less than or equal to a predetermined threshold; and
    an encoding unit for compressing and encoding, among portions of the input image data, an image data portion outside of the important region with use of a first quantization step value, and for further compressing and encoding an image data portion of the important region with use of a second quantization step value that is smaller than the first quantization step value.

2. The image processing apparatus according to claim 1, wherein in order to encode the important region, the encoding unit uses any one compression system among JPEG compression system, JPEG2000 compression system, and JPEG-XR compression system, and uses a quantization table having the second quantization step value.

3. A control method for an image processing apparatus that performs compression processing on image data, comprising the steps of:
    extracting at least one object region from image data that has been input;
    an analyzing unit for analyzing average color information of pixels in each at least one object region extracted by said region extraction unit and analyzing average color information of pixels in a peripheral region being in the periphery of the object region;
    a calculation unit for calculating a difference between the average color information of pixels in an object region of interest and that of pixels in a peripheral region of the object region of interest;
    selecting an object region of interest as the important region where degradation in image quality is to be reduced, if the difference is less than or equal to a predetermined threshold; and
    compressing and encoding, among portions of the input image data, an image data portion outside of the important region with use of a first quantization step value, and compressing and encoding an image data portion of the important region with use of a second quantization step value that is smaller than the first quantization step value.

4. A computer-readable non-transitory recording medium in which a computer program that causes a computer to execute the method according to claim 3 is recorded.

* * * * *